(12) United States Patent
Rohde et al.

(10) Patent No.: US 9,346,980 B2
(45) Date of Patent: May 24, 2016

(54) ADHESIVE TAPE FOR A FLYING ROLL CHANGE

(71) Applicant: ORAFOL Europe GmbH, Oranienburg (DE)

(72) Inventors: Holger Rohde, Berlin (DE); Michael Leis, Oppenweiler (DE)

(73) Assignee: ORAFOL EUROPE GMBH, Oranienburg (DE)

( * ) Notice: Subject to any disclaimer, the term of this patent is extended or adjusted under 35 U.S.C. 154(b) by 0 days.

(21) Appl. No.: 14/407,047

(22) PCT Filed: Jun. 10, 2013

(86) PCT No.: PCT/EP2013/061897
§ 371 (c)(1),
(2) Date: Dec. 10, 2014

(87) PCT Pub. No.: WO2013/186162
PCT Pub. Date: Dec. 19, 2013

(65) Prior Publication Data
US 2015/0166845 A1    Jun. 18, 2015

(30) Foreign Application Priority Data

Jun. 11, 2012 (EP) .................................... 12171464

(51) Int. Cl.
| C09J 7/02 | (2006.01) |
| C09J 7/04 | (2006.01) |
| B65H 19/18 | (2006.01) |
| B65H 19/10 | (2006.01) |
| C09J 5/00 | (2006.01) |

(52) U.S. Cl.
CPC ............. *C09J 7/0264* (2013.01); *B65H 19/102* (2013.01); *B65H 19/181* (2013.01); *B65H 19/1815* (2013.01); *B65H 19/1821* (2013.01); *C09J 5/00* (2013.01); *C09J 7/02* (2013.01); *C09J 7/0246* (2013.01); *C09J 7/0296* (2013.01); *C09J 7/04* (2013.01); *B65H 2301/41764* (2013.01); *B65H 2301/41766* (2013.01); *B65H 2301/4607* (2013.01); *B65H 2301/46072* (2013.01); *B65H 2301/46075* (2013.01); *B65H 2301/46078* (2013.01); *C09J 2203/30* (2013.01); *C09J 2203/342* (2013.01); *C09J 2400/283* (2013.01); *Y10T 428/1471* (2015.01); *Y10T 428/2848* (2015.01)

(58) Field of Classification Search
CPC ............... B65H 19/102; B65H 19/181; B65H 19/1815; B65H 19/1821; B65H 2301/4607; B65H 2301/46075; B65H 2301/46078; B65H 2301/46072; B32B 2037/268; C09J 2203/342
See application file for complete search history.

(56) References Cited

U.S. PATENT DOCUMENTS

| 5,692,699 | A * | 12/1997 | Weirauch | B65H 19/102 242/556.1 |
| 5,901,919 | A | 5/1999 | Wienberg | |
| 6,595,461 | B1 | 7/2003 | Storbeck et al. | |
| 7,086,627 | B2 * | 8/2006 | Kehler | B65H 19/102 156/304.1 |
| 2005/0006520 | A1 * | 1/2005 | Gassner | B65H 19/102 242/555.3 |
| 2005/0029390 | A1 * | 2/2005 | Eikmeier | B65H 19/102 242/555.3 |

FOREIGN PATENT DOCUMENTS

| DE | 196 28 317 A1 | 1/1998 |
| EP | 0 818 408 A1 | 1/1998 |
| EP | 1 022 245 B1 | 4/2004 |

* cited by examiner

*Primary Examiner* — Mark A Osele
(74) *Attorney, Agent, or Firm* — Maschoff Brennan

(57) ABSTRACT

The invention relates to an adhesive tape for a flying roll change, including: a carrier material (1) with an upper side, an underside and two longitudinal edges (1a, 1b), wherein the upper side of the carrier material (1) is coated with an adhesive (4) and the underside of the carrier material (1) is formed non-adhesive; and a double-sided adhesive tape (2) with an upper side, an underside and two longitudinal edges (2a, 2b), which includes a cleavable carrier material (21) which on both sides is coated with an adhesive (22, 23). The double-sided adhesive tape (2) is arranged on the underside of the carrier material (1). It is provided that the double-sided adhesive tape (2) is arranged on the underside of the carrier material (1) such that a partial region (B) of the double-sided adhesive tape (2) protrudes from the one longitudinal edge (1a) of the carrier material (1). The invention furthermore relates to the use of such adhesive tape for a flying roll change.

19 Claims, 4 Drawing Sheets

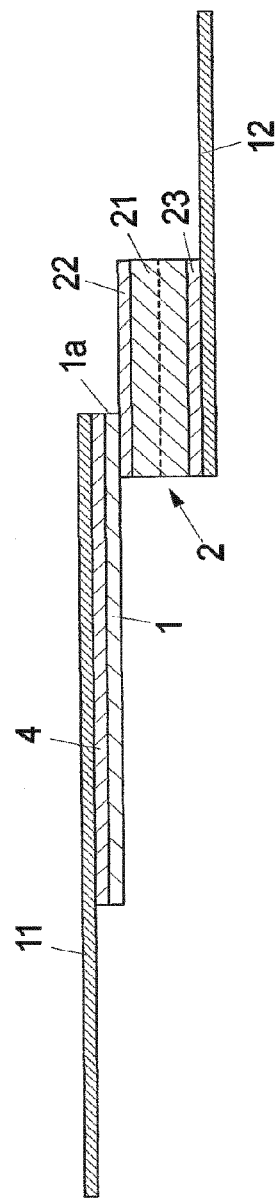
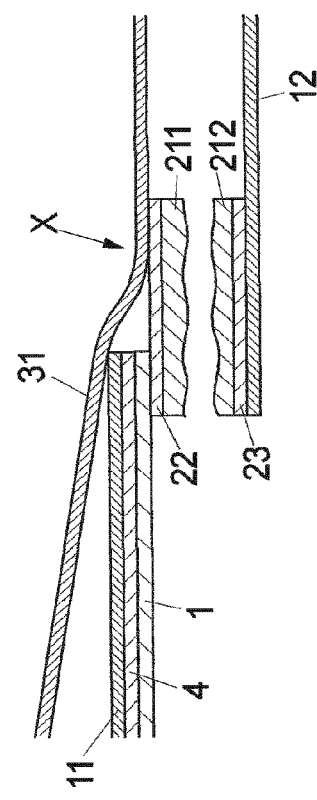

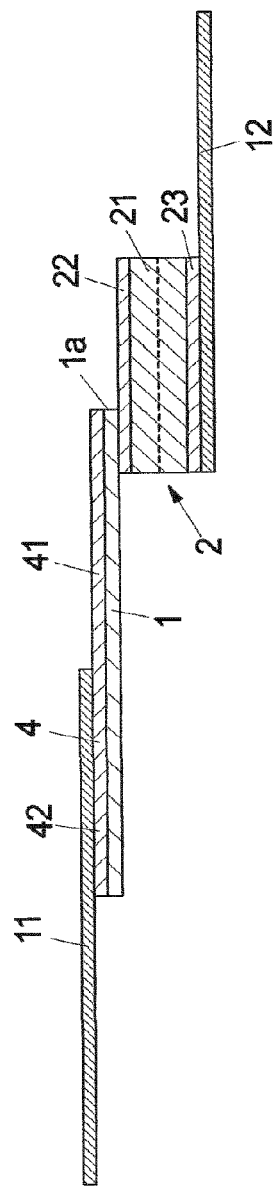
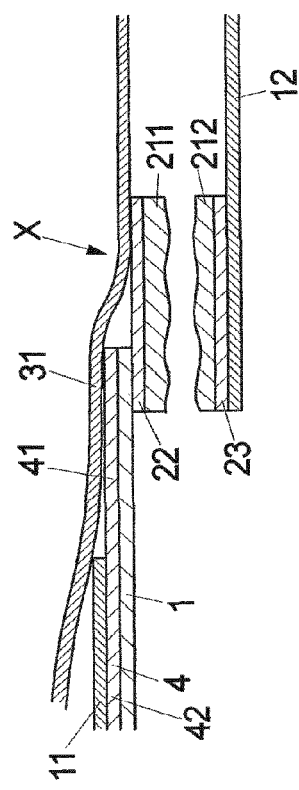

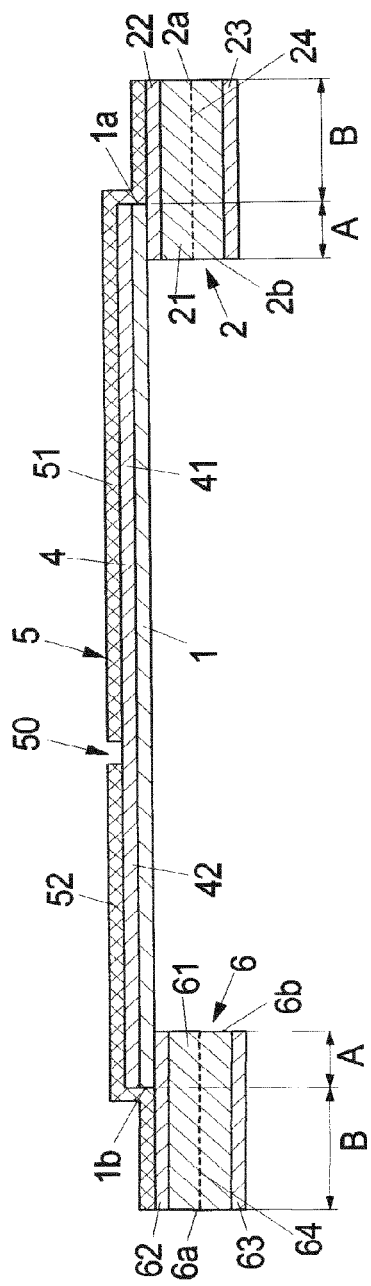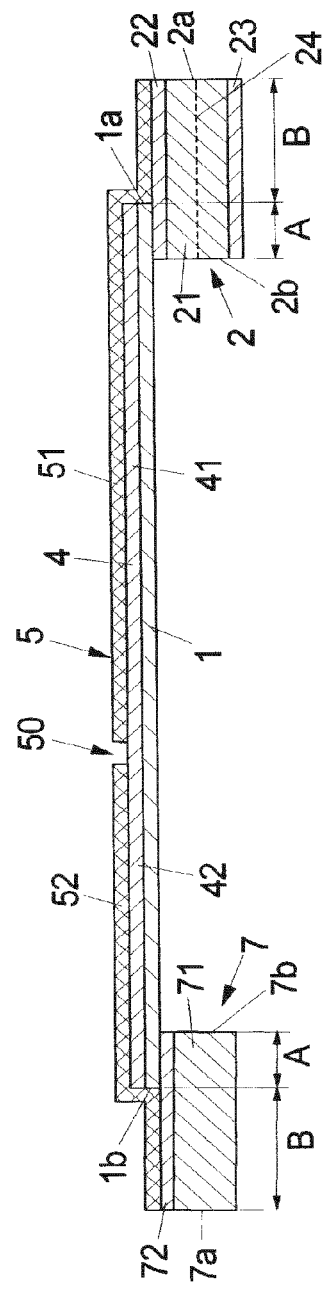

ADHESIVE TAPE FOR A FLYING ROLL CHANGE

CROSS-REFERENCE TO A RELATED APPLICATION

This application is a National Phase Patent Application of International Patent Application Number PCT/EP2013/061897, filed on Jun. 10, 2013, which claims priority of European Patent Application Number 12171464.6, filed on Jun. 11, 2012.

BACKGROUND

This invention relates to an adhesive tape for a flying roll change.

From EP 1 022 245 B1 a generic adhesive tape is known. The adhesive tape comprises a paper backing as well as a double-sided adhesive tape with a splitting paper coated with self-adhesive mass on both sides. The double-sided adhesive tape is arranged behind the one longitudinal edge of the paper backing at a distance of 0.5 mm to 15 mm.

Such adhesive tapes are used in a flying roll change. In paper mills and in rotary printing, for example, a flying roll change represents a usual method, in order to replace an old, almost exhausted paper roll by a new paper roll. The new roll is mounted and accelerated, when the exhausting paper roll is nearing its end. The acceleration is effected, until the circumferential speed of the new roll corresponds to the web velocity of the currently exhausting web. A connection of the new roll with the exhausting web of the old roll is effected by using a generic adhesive tape. In addition, reference is also made to EP 0 818 408 B1.

SUMMARY

It is an object underlying the present invention to provide a further adhesive tape for a flying roll change.

According to an exemplary embodiment of the present invention an adhesive tape in which the double-sided adhesive tape is arranged on the underside of the carrier material such that a partial region of the double-sided adhesive tape protrudes from the one longitudinal edge of the carrier material. This means that the one longitudinal edge of the double-sided adhesive tape extends offset and hence protruding from the longitudinal edge of the carrier material and the other longitudinal edge of the double-sided adhesive tape extends on the underside of the carrier material, so that a first partial region of the double-sided adhesive tape is attached to the underside of the carrier material and extends up to the longitudinal edge of the carrier material, and a second partial region of the double-sided adhesive tape protrudes from the carrier material and its longitudinal edge.

The solution according to the invention involves the advantage that during a flying roll change the cleavable carrier material to be cleaved or spliced directly gets in contact with the layer of an (old) roll due to its protrusion from the carrier material and is cleaved directly by means of this layer. Cleaving of the cleavable carrier material thereby is provided in a safe and effective way.

The carrier material for example is a paper backing or a plastic backing. In principle, the carrier material can be formed of an arbitrary flat material.

The cleavable carrier material can be formed by an arbitrary flat material which in the case of opposite forces acting on the adhesive-coated upper side and underside experiences a cleavage. For example, the cleavable carrier material is a splitting paper, i.e. a paper backing liable to splicing.

The adhesive with which the upper side of the carrier material and the upper side and underside of the cleavable carrier material are coated is formed for example by a contact adhesive, for example a water-soluble pressure-sensitive contact adhesive. However, other contact adhesives can be used as well.

In one exemplary embodiment of the invention, the protruding partial region of the double-sided adhesive tape forms a protruding region extending parallel to the longitudinal edge of the carrier material. This means that the longitudinal edges of the double-sided adhesive tape extend parallel to the longitudinal edges of the carrier material and between themselves define a rectangular region. In principle, however, an angular arrangement of the respective longitudinal edges relative to each other can also be provided. It should also be noted that a longitudinal edge in the sense of the present invention merely is understood to be a longitudinal boundary of the respective carrier material. This boundary can be straight, but can also have other shapes such as e.g. a wave shape. When the outer longitudinal edge of the double-sided adhesive tape is formed wave-shaped, for example, the protruding partial region of the double-sided adhesive tape does not form a parallel, rectangular strip, but a wave-shaped contour protruding at its edge.

The protruding partial region of the double-sided adhesive tape for example has a width between 2 mm and 35 mm. For example, there is realized a width of the protruding partial region of about 5 to 25 mm. The non-protruding partial region of the double-sided adhesive tape, which is located on the underside of the carrier material, for example has a width between 1.5 mm and 20 mm, for example a width of about 2 to 10 mm. In exemplary embodiments, the width of the protruding partial region thus is greater than the width of the non-protruding partial region adhering to the underside of the carrier material.

According to one exemplary aspect of the present invention, the adhesive on the upper side of the carrier material is covered with a peelable cover layer. The peelable cover layer can be removed from the upper side of the carrier material or the adhesive coating realized there in such a way that no adhesive is left at the peelable cover layer, and after peeling off the peelable cover layer, the carrier material can enter into an adhesive connection with a further material by pressing due to the adhesive realized on its upper side. The peelable cover layer for example is a siliconized paper.

In one exemplary design variant it is provided that the peelable cover layer extends beyond the one longitudinal edge of the separating material to such an extent that it also covers the adhesive-coated side of the cleavable carrier material. The cover layer thus serves for covering and protecting both the adhesive-coated upper side of the carrier material and the adhesive-coated upper side of the cleavable carrier material. The peelable cover layer preferably is formed such that its longitudinal edge lies on the longitudinal edge of the double-sided adhesive tape or its cleavable carrier material.

According to a further exemplary embodiment, the cover layer is provided with a slit. The realization of the slit serves to position the uppermost layer of a paper web or material web before a flying roll change, wherein initially a first partial region of the cover layer is removed and connected with the paper web or material web, and subsequently a second partial region of the cover layer is removed for clearing an adhesive surface for connection with a further paper web or material web.

According to one exemplary embodiment, said slit is formed at a distance between 10 mm and 30 mm from the longitudinal edge of the carrier material, which is located opposite the longitudinal edge to which the double-sided adhesive tape is attached.

On the adhesive-coated underside of the cleavable carrier material there can also be arranged a peelable cover layer. The same likewise can comprise a siliconized paper or be formed of such paper.

A further exemplary embodiment of the invention provides that a tape with an upper side, an underside and two longitudinal edges, which includes a carrier material, also is arranged in the region of the other longitudinal edge of the carrier material on its underside and there protrudes from the other longitudinal edge of the carrier material. For this further tape it also applies that the one longitudinal edge of the tape extends offset and hence protruding from the corresponding longitudinal edge of the carrier material, and the other longitudinal edge of the tape extends on the underside of the carrier material, so that a first partial region of the tape is attached to the underside of the carrier material and extends up to the longitudinal edge of the carrier material, and a second partial region of the tape protrudes from the carrier material and its longitudinal edge.

A first design variant thereof provides that the further tape likewise is a double-sided adhesive tape which includes a cleavable carrier material. The adhesive tape thus is constructed symmetrically at both longitudinal edges of the carrier material.

A second design variant thereof provides that the further tape is coated with an adhesive merely unilaterally towards the carrier material. The other side of the tape, however, is formed non-adhesive. The carrier material can consist of a cleavable or a non-cleavable material. According to this design variant, the further tape merely has the function of a spacer.

In a further aspect of the invention, the invention relates to the use of an adhesive tape according to the invention for a flying roll change, wherein
  the adhesive-coated upper side of the carrier material is at least partly bonded to the underside of the uppermost layer of a new roll,
  the adhesive-coated underside of the double-sided adhesive tape is bonded to the upper side of the underlying next following layer of the new roll,
  wherein the adhesive is exposed on the upper side of the partial region of the double-sided adhesive tape protruding from the longitudinal edge of the carrier material and there provides an adhesive layer for connection with a layer of an old roll, and
  in the flying roll change one layer of the old roll is directly bonded at least to this exposed adhesive layer and the cleavable carrier material is cleaved.

According to one exemplary embodiment it is provided that before the flying roll change a partial region of the adhesive-coated upper side of the carrier material also is exposed and this partial region likewise is bonded to the layer of the old paper roll during the flying roll change. Before the flying roll change, this partial region preferably is covered by a partial region of a peelable cover layer.

BRIEF DESCRIPTION OF THE DRAWINGS

The invention will be explained in detail below by means of an exemplary embodiment with reference to the Figures of the drawing.

FIG. 3 shows the arrangement of the adhesive tape of FIG. 1 on a paper roll according to FIG. 2.

FIG. 4 schematically shows the use of the arrangement of FIG. 3 in a flying roll change.

FIG. 5 shows a modified arrangement of the adhesive tape of FIG. 1 on a paper roll according to FIG. 2.

FIG. 6 schematically shows the use of the arrangement of FIG. 5 in a flying roll change.

FIG. 7 shows a first alternative exemplary embodiment in which an adhesive tape is arranged along both longitudinal edges of the carrier material.

FIG. 8 shows a second alternative exemplary embodiment in which an adhesive tape is arranged along both longitudinal edges of the carrier material.

DETAILED DESCRIPTION

Figure 1:
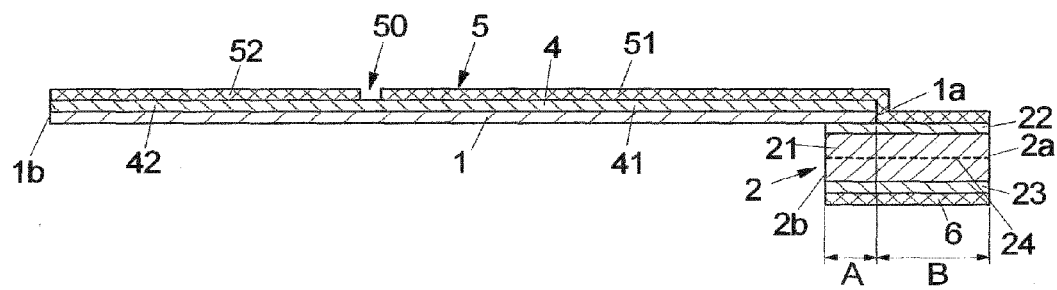
FIG. 1 shows a schematic sectional view of an adhesive tape according to the invention.

FIG. 1 shows an exemplary embodiment of an adhesive tape according to the invention. The adhesive tape comprises a carrier material 1, which for example is a paper backing, an aluminized paper backing, a plastic backing or a reflective backing. The carrier material 1 comprises an upper side, an underside and two longitudinal edges 1a, 1b. The upper side of the carrier material 1 is unilaterally coated with an adhesive 4, so that an adhesive layer 4 is present. The adhesive 4 for example is a water-soluble, pressure-sensitive contact adhesive. The underside of the carrier material 1 is formed non-adhesive.

The adhesive tape furthermore comprises a double-sided adhesive tape 2. The same consists of a cleavable carrier material 21 which on an upper side and on an underside each is coated with an adhesive 22, 23, so that an upper adhesive layer 22 and a lower adhesive layer 23 are realized. The double-sided adhesive tape 2 or the cleavable carrier material 21 likewise have two longitudinal edges 2a, 2b, which in the illustrated exemplary embodiment are formed straight, but can also have another, e.g. wave-like shape.

The cleavable carrier material 21 for example is a splitting paper. The cleavable carrier material 21 has a distinctly smaller splitting resistance than the carrier material 1, i.e. it is less suitable to absorb tensile forces than the carrier material 1. In particular the cleavable carrier material 21 is formed such that upon occurrence of tensile forces on the adhesive layers 22 and 23 it is split over its surface, wherein it forms two layers, one of which remains connected with the adhesive layer 22 and the other one with the adhesive layer 23. This is indicated by the broken line 24 of the cleavable carrier material 21.

The cleavable carrier material 21 for example is a duplex paper, an easily splitting paper or a sized paper system. Such splitting papers are known to the skilled person and described for example in EP 1 022 245 B1.

The double-sided adhesive tape 2 now is arranged on the underside of the carrier material 1 such that a partial region A of the double-sided adhesive tape 2 is adhered to the underside of the carrier material 1 via the adhesive layer 22 and extends up to the longitudinal edge 1b. A further partial region B on the other hand protrudes from the longitudinal edge 1a of the carrier material 1. In other words, the one longitudinal edge 2a of the double-sided adhesive tape 2 extends offset to the outside with respect to the longitudinal edge 1a of the carrier material 1 and the other longitudinal edge 2b of the double-sided adhesive tape 2 extends along the underside of the carrier material 1.

It is provided that the partial region B, which protrudes from the carrier material 1 and the longitudinal edge 1a, is broader than the partial region A which is located below the carrier material 1. For example, the width of the region A is between 1.5 mm and 20 mm, and the width of the region B is between 2 mm and 35 mm.

The adhesive tape of FIG. 1 furthermore comprises two peelable cover layers 5, 6. The one peelable cover layer 5 is arranged on the upper side of the adhesive layer 4. It includes a slit 50 which divides the cover layer 5 into two partial regions 51, 52. Furthermore, the lower adhesive layer 23 of the double-sided adhesive tape 2 also is connected with a peelable cover layer 6.

The peelable cover layer 5, 6 for example is a siliconized paper. However, there can also be used other cover materials which allow a removal from an underlying adhesive layer without entraining adhesive material of the adhesive layer.

It should be noted that the partial region 51 of the cover layer 5 extends beyond the longitudinal edge 1a of the separating material 1 to such an extent that it also covers the upper side of the cleavable carrier material 21, which is coated with an adhesive 22, or the adhesive layer 22. The longitudinal edge of the cover layer 51 thus lies on the longitudinal edge 2a of the double-sided adhesive tape 2.

The kink of the cover layer 5 in the transition to the double-sided adhesive tape 2, which is shown in FIG. 1, only is due to the schematic representation and not realized in an actual embodiment or not realized in this strength, since the thickness of the layer 1 is below 0.5 mm, for example about 0.1 mm, and the thickness of the adhesive layer 4 is still smaller.

The above-mentioned slit 50 of the cover layer 5 for example extends at a distance between 10 mm and 30 mm from the longitudinal edge 1b.

Figure 2:
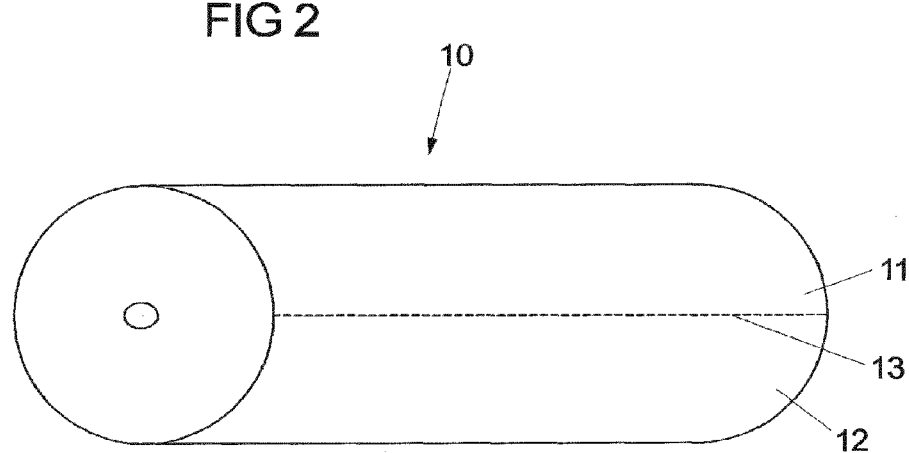
FIG. 2 shows a schematic representation of a paper roll with an uppermost layer and a next following layer.

FIG. 2 shows a new paper roll 10 with an uppermost layer 11 and a next following layer 12. The longitudinal edge of the uppermost layer 11, below which the next following layer 12 is located, is designated with the reference numeral 13.

FIG. 3 shows the attachment of the adhesive tape of FIG. 1 at a paper roll according to FIG. 2 in preparation of a flying roll change. The cover layers 51, 52, 6 of the adhesive tape of FIG. 1 have been removed, so that the corresponding adhesive layers 4, 22, 23 are freely accessible.

According to FIG. 3, the adhesive layer 4 is adhered to the underside of the uppermost paper layer 11. At the same time, the adhesive layer 23 of the double-sided adhesive tape 2 is attached to the upper side of the next following layer 21, so that the layer 11 is firmly adhered to the layer 12 via the adhesive tape. It should be noted that the adhesive layer 22 is exposed on the upper side of the cleavable carrier material 21.

FIG. 4 now shows the use of the arrangement of FIG. 3 in a flying roll change. There is considered the situation that the uppermost layer 11 of the new paper roll 10 is to be connected with a paper layer 31 of an old paper roll (not shown). After the two rolls have been accelerated to the same web speed, the new roll 10 or the old roll is pressed such the paper layer 31 of the old roll comes to rest against the adhesive layer 22 of the double-sided adhesive tape 2, wherein in a region X an adhesive connection between the double-sided adhesive tape 2 and the layer 31 of the old paper roll on the other hand is obtained. The layer 31 thereby is connected with the uppermost layer 11 of the new roll.

The adhesive connection in the region X leads to tensile forces acting on the cleavable carrier material 21, so that the same is split over its surface, by leaving two residual regions 211, 212, wherein the one residual region 211 is connected with the adhesive layer 22 and the other residual region 212 is connected with the adhesive layer 23. Splitting the cleavable carrier material 2 leads to a detachment of the layer 12. The layer 31 of the old paper roll alone is connected with the layer 11; the flying roll change has been effected.

FIGS. 5 and 6 show a modification of the arrangement and the method of FIGS. 3 and 4. According to this modification the uppermost layer 11 of the paper roll 10 does not extend up to the longitudinal edge 1a of the carrier material 1, but ends before the same. Other differences do not exist.

Thus, it is provided that the carrier material 1 is attached to the underside of the uppermost layer 11 only in a region 42 of the adhesive layer which is located below the cover layer 52 of FIG. 1, and ends in the region of the slit 50 of FIG. 1. This means that in addition to the surface 22 of the double-sided adhesive tape 2 the region 41 of the adhesive layer 4, which is located below the cover layer 51 of FIG. 1, also is available for an adhesive connection with the paper layer 31, as is shown in FIG. 6. The surface altogether provided for an adhesive connection thereby is increased. In this design variant, the cover layer 51 of FIG. 1 can be removed only shortly before carrying out the flying roll change.

In both design variants, the material 21 to be spliced is connected directly with the paper layer 31 of the old roll and subsequently separated, i.e. via the adhesive layer 22 and its adhesive surface the paper layer 31 of the old roll directly gets in contact with the material 21 to be spliced and causes splitting of the cleavable carrier material 21. Splitting of the cleavable carrier material 21 thereby is ensured in a particularly safe and effective way.

FIG. 7 shows a further exemplary embodiment of an adhesive tape according to the invention. In this adhesive tape a double-sided adhesive tape 2 not only is arranged on the underside of the carrier material 1 along the one longitudinal edge 1a, like in the exemplary embodiment of FIG. 1, but such double-sided adhesive tape 6 furthermore is arranged on the underside of the carrier material in the region of the other longitudinal edge 1b of the carrier material 1. The structure at the two longitudinal edges 1a, 1b of the carrier material 1 is symmetrical.

Correspondingly, the further double-sided adhesive tape 6 also comprises a cleavable carrier material 61 which on an upper side and on an underside each is coated with an adhesive 62, 63, so that an upper adhesive layer 62 and a lower adhesive layer 63 are realized. The double-sided adhesive tape 6 or the cleavable carrier material 61 likewise have two longitudinal edges 6a, 6b, which in the illustrated exemplary embodiment are formed straight, but can also have another, for example wave-like shape.

The cleavable carrier material 61 of the double-sided adhesive tape 6 is constructed in the same way as the cleavable carrier material 21 of the double-sided adhesive tape 2 and correspondingly is formed for example by a splitting paper. Upon occurrence of tensile forces acting on the adhesive layers 62 and 63, the cleavable carrier material 61 is split over its surface, wherein it forms two layers, one of which remains connected with the adhesive layer 62 and the other one remains connected with the adhesive layer 63. This is indicated by the broken line 64 of the cleavable carrier material 6.

Things are the same both in the double-sided adhesive tape 2 and in the double-sided adhesive tape 6, so that a first partial region A is adhered to the underside of the carrier material 1 via the adhesive layer 62 and extends up to the longitudinal edge 1b. A further partial region B on the other hand protrudes from the longitudinal edge 1b of the carrier material 1.

The second strip 6 on the one hand serves for improving the stability of the paper rolls which during a flying roll change are connected with each other by means of the adhesive tape. On the other hand, the second strip 6 serves to provide for an even more accurate fixation of the adhesive tape on the new paper roll of the paper to be spliced. With the second strip 6, both longitudinal edges of the adhesive tape can be fixed on the new paper roll and not only one longitudinal edge. This eliminates the risk (although a low risk only) that after fixation on a new paper roll the adhesive tape is folded down from the paper web with its one longitudinal edge and the fixation of the outer layer of the new paper roll thereby becomes difficult.

It should be noted that in the representation of FIG. 7 the illustration of a peelable cover layer on the adhesive layers 23, 63 corresponding to the cover layer 6 of FIG. 1 has been omitted. Such peelable cover layers, however, can of course be present.

FIG. 8 shows a further exemplary embodiment in which a further tape 7 also is arranged on the underside of the carrier material 1 in the region of the other longitudinal edge 1*b* thereof and protrudes from the longitudinal edge 1*b* of the carrier material.

In this exemplary embodiment, however, the further tape 7 is not designed as double-sided adhesive tape. The tape 7 rather consists of a carrier material 71 which does not represent a cleavable material. On the side facing the carrier material 1, i.e. on its upper side, the carrier material 71 has a coating with an adhesive 72, so that an upper adhesive layer 72 is realized. On the underside of the carrier material 71, on the other hand, no adhesive layer is realized, so that the carrier material 71 is not adhesive on the underside.

A partial protrusion of the tape 7 in a partial region B with respect to the longitudinal edge 1*b* of the carrier material 1 is realized in the exemplary embodiment of FIG. 7 just like in the exemplary embodiment of FIG. 7.

In a further design variant, the carrier material 71 in the configuration of FIG. 8 likewise consists of a cleavable material, for example of the same material as the carrier material 21 of the double-sided adhesive tape 2. In this configuration, however, an adhesive layer is not realized either on the underside of the carrier material 71, so that the carrier material is not cleaved during the splicing operation.

In the design variant of FIG. 8, the further strip 7 serves as spacer without having a technical importance for the actual splicing process.

Both in the exemplary embodiment of FIG. 7 and in the exemplary embodiment of FIG. 8, the double-sided adhesive tape 2 is formed at the longitudinal edge 1*a* of the carrier material 1, as explained with respect to FIG. 1. The method for the flying roll change is effected corresponding to FIGS. 3 and 4 or corresponding to FIGS. 5 and 6, but with the correspondingly changed adhesive tape of FIG. 7 or 8.

The invention is not limited in its feasibility to the exemplary embodiments described above, which merely are to be understood by way of example. For example, the illustrated dimensions and proportions are to be understood by way of example only.

The invention claimed is:

1. An adhesive tape for a flying roll change, comprising:
   a carrier material with an upper side, an underside and two longitudinal edges, wherein the upper side of the carrier material is coated with an adhesive and the underside of the carrier material is formed non-adhesive,
   a double-sided adhesive tape with an upper side, an underside and two longitudinal edges, which includes a cleavable carrier material which on both sides is coated with an adhesive,
   wherein the double-sided adhesive tape is arranged on the underside of the carrier material such that a partial region of the double-sided adhesive tape protrudes from a first longitudinal edge of the carrier material.

2. The adhesive tape according to claim 1, wherein the carrier material is formed by a paper backing.

3. The adhesive tape according to claim 1, wherein the carrier material is formed by a plastic backing.

4. The adhesive tape according to claim 1, wherein the cleavable carrier material is formed by a splitting paper.

5. The adhesive tape according to claim 1, wherein the adhesive is a contact adhesive, in particular a water-soluble pressure-sensitive contact adhesive.

6. The adhesive tape according to claim 1, wherein the protruding partial region of the double-sided adhesive tape forms a region extending parallel to the longitudinal edge of the carrier material.

7. The adhesive tape according to claim 6, wherein the protruding partial region of the double-sided adhesive tape has a width between 2 mm and 35 mm.

8. The adhesive tape according to claim 1, wherein the non-protruding partial region of the double-sided adhesive tape, which is located on the underside of the carrier material, has a width between 1.5 mm and 20 mm.

9. The adhesive tape according to claim 1, wherein on the upper side of the carrier material the adhesive is covered with a peelable cover layer.

10. The adhesive tape according to claim 9, wherein the cover layer extends beyond the first longitudinal edge of the carrier material to such an extent that it also covers the adhesive-coated upper side of the protruding region of the cleavable carrier material.

11. The adhesive tape according to claim 9, wherein the cover layer comprises a siliconized paper.

12. The adhesive tape according to claim 9, wherein the cover layer is provided with a slit.

13. The adhesive tape according to claim 12, wherein the slit is arranged at a distance between 10 mm and 30 mm from the longitudinal edge of the carrier material, which is located opposite the longitudinal edge at which the double-sided adhesive tape protrudes.

14. The adhesive tape according to claim 1, wherein the adhesive on the underside of the cleavable carrier material is covered with a peelable cover layer.

15. The adhesive tape according to claim 1, wherein a tape with an upper side, an underside and two longitudinal edges, which includes a carrier material, also is arranged in the region of a second longitudinal edge of the carrier material on its underside and protrudes from the other longitudinal edge of the carrier material.

16. The adhesive tape according to claim 15, wherein the further tape likewise is a double-sided adhesive tape which includes a cleavable carrier material.

17. The adhesive tape according to claim 15, wherein the further tape is coated with an adhesive merely unilaterally towards the carrier material.

18. Use of an adhesive tape according to claim 1 for a flying roll change, wherein
   the upper side of the carrier material, which is coated with an adhesive, is at least partly bonded to the underside of the uppermost layer of a new roll, the underside of the double-sided adhesive tape, which is coated with an adhesive, is bonded to the upper side of the underlying next following layer of the new roll, wherein the adhesive is exposed on the upper side of the partial region of the double-sided adhesive tape protruding from the longitudinal edge of the carrier material and there provides an adhesive layer for connection with a layer of an old roll, and in the flying roll change one layer of the old roll is directly bonded at least to this exposed adhesive layer and the cleavable carrier material is cleaved.

19. The use according to claim 18, wherein before the flying roll change a partial region of the upper side of the carrier material, which is coated with an adhesive, also is exposed and this partial region likewise is bonded to the layer of the old roll during the flying roll change.

\* \* \* \* \*